US011864218B1

(12) United States Patent
Kwok et al.

(10) Patent No.: US 11,864,218 B1
(45) Date of Patent: Jan. 2, 2024

(54) 5G NEW RADIO UPLINK INTERMODULATION DISTORTION MITIGATION

(71) Applicant: T-Mobile USA, Inc., Bellevue, WA (US)

(72) Inventors: Ming Shan Kwok, Seattle, WA (US); Wafik Abdel Shahid, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 191 days.

(21) Appl. No.: 17/344,621

(22) Filed: Jun. 10, 2021

(51) Int. Cl.
*H04W 72/541* (2023.01)
*H04L 5/00* (2006.01)
*H04L 27/26* (2006.01)

(52) U.S. Cl.
CPC ........... *H04W 72/541* (2023.01); *H04L 5/001* (2013.01); *H04L 27/2605* (2013.01); *H04L 27/2627* (2013.01)

(58) Field of Classification Search
CPC .. H04W 72/541; H04L 5/001; H04L 27/2605; H04L 27/2627
See application file for complete search history.

(56) References Cited

U.S. PATENT DOCUMENTS

| 8,462,609 B2 | 6/2013 | Berggren et al. |
| 9,473,286 B1 | 10/2016 | Shipley et al. |
| 10,548,129 B2 | 1/2020 | Fwu et al. |
| 10,708,850 B2 | 7/2020 | Malladi et al. |
| 10,873,958 B1* | 12/2020 | Mansour ........... H04W 72/1268 |
| 10,904,935 B2 | 1/2021 | Kwok et al. |
| 2009/0196163 A1 | 8/2009 | Du |
| 2009/0232234 A1 | 9/2009 | Du |

(Continued)

FOREIGN PATENT DOCUMENTS

| CN | 105830379 B | 6/2019 |
| EP | 1876730 A1 | 1/2008 |

(Continued)

OTHER PUBLICATIONS

""3GPP," ETSI TS 138.101-3 version 15.2.0" Release 15, Jul. 2018, 183 pages.

*Primary Examiner* — Ayaz R Sheikh
*Assistant Examiner* — Tarell A Hampton
(74) *Attorney, Agent, or Firm* — Perkins Coie LLP

(57) ABSTRACT

The disclosed technology provides a system and method for determining an uplink (UL) waveform for a mobile device to use for UL transmission in carrier aggregation or dual connectivity modes, where the UL waveform is selected to eliminate or minimize the deleterious effects of intermodulation distortion (IMD). The system identifies frequency bands scheduled for use by the mobile device for concurrent UL transmissions and for DL transmissions and determines if the combination of frequency bands can lead to high IMD. If the combination can lead to high IMD, the system can instruct the mobile device to switch to a Discrete Fourier Transform (DFT)-spread Orthogonal Frequency Division Multiplexing (OFDM) (DFT-s-OFDM) waveform for UL transmissions; if the combination would not likely lead to high IMD, the system can instruct the mobile device to switch to a Cyclic Prefix OFDM (CP-OFDM) waveform for the UL transmissions.

18 Claims, 4 Drawing Sheets

(56) References Cited

U.S. PATENT DOCUMENTS

| | | | |
|---|---|---|---|
| 2012/0257519 A1 | 10/2012 | Frank et al. | |
| 2019/0053115 A1* | 2/2019 | Ngai | H04W 72/53 |
| 2019/0081649 A1* | 3/2019 | Khlat | H04B 1/1027 |
| 2019/0098681 A1* | 3/2019 | Kwok | H04W 52/243 |
| 2019/0149184 A1 | 5/2019 | Jung et al. | |
| 2019/0158137 A1* | 5/2019 | Brunel | H04B 1/0064 |
| 2019/0230663 A1* | 7/2019 | Lim | H04W 72/0453 |
| 2019/0327779 A1* | 10/2019 | Lee | H04L 5/0082 |
| 2019/0380135 A1* | 12/2019 | Kwok | H04W 72/1215 |
| 2020/0045720 A1* | 2/2020 | Abdel Shahid | H04W 72/23 |
| 2020/0068414 A1* | 2/2020 | Karimli | H04W 16/26 |
| 2020/0205146 A1* | 6/2020 | Takahashi | H04J 11/0023 |
| 2020/0236611 A1* | 7/2020 | Hong | H04W 72/0446 |
| 2020/0245343 A1* | 7/2020 | Kim | H04L 1/1854 |
| 2020/0267665 A1* | 8/2020 | Wei | H04W 52/365 |
| 2020/0275526 A1* | 8/2020 | Sharma | H04W 8/24 |
| 2020/0288412 A1* | 9/2020 | Ajdakple | H04W 72/0446 |
| 2020/0322187 A1 | 10/2020 | He et al. | |
| 2021/0022073 A1* | 1/2021 | Kwok | H04W 72/21 |
| 2021/0029698 A1* | 1/2021 | Lim | H04B 17/21 |
| 2021/0092662 A1* | 3/2021 | Takahashi | H04B 1/525 |
| 2021/0136851 A1 | 5/2021 | Kwok et al. | |
| 2021/0195574 A1* | 6/2021 | Hong | H04W 24/02 |
| 2021/0227475 A1* | 7/2021 | Tang | H04W 52/16 |
| 2021/0376989 A1* | 12/2021 | Lim | H04B 17/345 |
| 2022/0167369 A1* | 5/2022 | Bin Sediq | H04W 72/541 |
| 2022/0271883 A1* | 8/2022 | Bin Sediq | H04L 1/1887 |

FOREIGN PATENT DOCUMENTS

| | | |
|---|---|---|
| EP | 1895703 A1 | 3/2008 |
| EP | 2041891 A1 | 4/2009 |
| EP | 2041906 A2 | 4/2009 |
| EP | 2286613 A1 | 2/2011 |
| EP | 2524464 A1 | 11/2012 |
| EP | 3272034 B1 | 5/2020 |
| JP | 2009543406 A | 12/2009 |
| JP | 2012531833 A | 12/2012 |
| JP | 2013517652 A | 5/2013 |
| JP | 5395961 B2 | 10/2013 |
| KR | 20090054954 A | 6/2009 |
| KR | 20120115605 A | 10/2012 |
| WO | 2008004146 A1 | 1/2008 |
| WO | 2008004155 A2 | 1/2008 |
| WO | 2009152657 A1 | 12/2009 |
| WO | 2010051752 A1 | 5/2010 |
| WO | 2011085804 A1 | 7/2011 |
| WO | 2012050838 A1 | 4/2012 |
| WO | 2012122937 A1 | 9/2012 |

\* cited by examiner

5G NEW RADIO UPLINK INTERMODULATION DISTORTION MITIGATION

BACKGROUND

5G New Radio (NR) is expected to coexist with 4G Long Term Evolution (LTE) or E-UTRAN (Evolved-UMTS Terrestrial Radio Access Network) systems both during the initial deployment phase (providing a seamless transition from 4G LTE to 5G NR) and even later when 5G is widely deployed nationwide. For example, heterogenous networks (HetNets) providing for E-UTRAN-NR Dual Connectivity (EN-DC) will exist to provide, for example, better in-building connectivity and indoor coverage using user equipment or terminal equipment simultaneously connected to 5G small cell devices and 4G macro base stations or vice-versa.

However, some of the band combinations that will be aggregated between 5G NR and 4G LTE will create high levels of intermodulation power in specific bands. This intermodulation power will create intermodulation distortion (IMD) which can desensitize the receiver, degrade the transmitted uplink (UL) and downlink (DL) signals, lead to a loss of spectrum efficiency, and lead to service quality issues to mobile operator subscribers. It is therefore beneficial to mitigate the effects of intermodulation distortion on aggregated bands, including IMD arising from 4G and 5G co-existence, and in mobile devices operating in LTE and NR standalone (SA) dual connectivity and carrier aggregation modes.

BRIEF DESCRIPTION OF THE DRAWINGS

Detailed descriptions of implementations of the present invention will be described and explained using the accompanying drawings.

DETAILED DESCRIPTION

In one example aspect of the disclosed technology, a wireless communications network identifies uplink (UL) frequency resources scheduled to a mobile device or user equipment (UE) for concurrent UL transmissions, e.g., multiple-uplink carrier aggregation (CA) or dual-connectivity (DC) transmissions. The network also identifies downlink (DL) frequency resources scheduled to the mobile device for DL transmission. The network then determines, based on the UL and DL frequency resources, if there is a high risk of IMD from the UL frequency resources falling in the DL frequency resources. If there is a high risk, the system can notify the mobile device to switch to a Discrete Fourier Transform (DFT)-spread Orthogonal Frequency Division Multiplexing (OFDM) (DFT-s-OFDM) waveform for the concurrent UL transmissions. On the other hand, if the risk is not high, the system can notify to mobile device to switch to or remain on a Cyclic Prefix (CP) OFDM (CP-OFDM) waveform for the concurrent UL transmissions.

In another example aspect of the disclosed technology, a processor or server in the network queries a memory or database in the network, where the query includes the UL frequency bands (e.g., the frequency bands of UL component carriers scheduled or granted for use by the mobile device) and DL frequency band(s). The processor or server returns a query response with data from the database or memory which the network can use to identify the UL waveforms or UL access schemes for use by the mobile device for concurrent UL transmissions.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
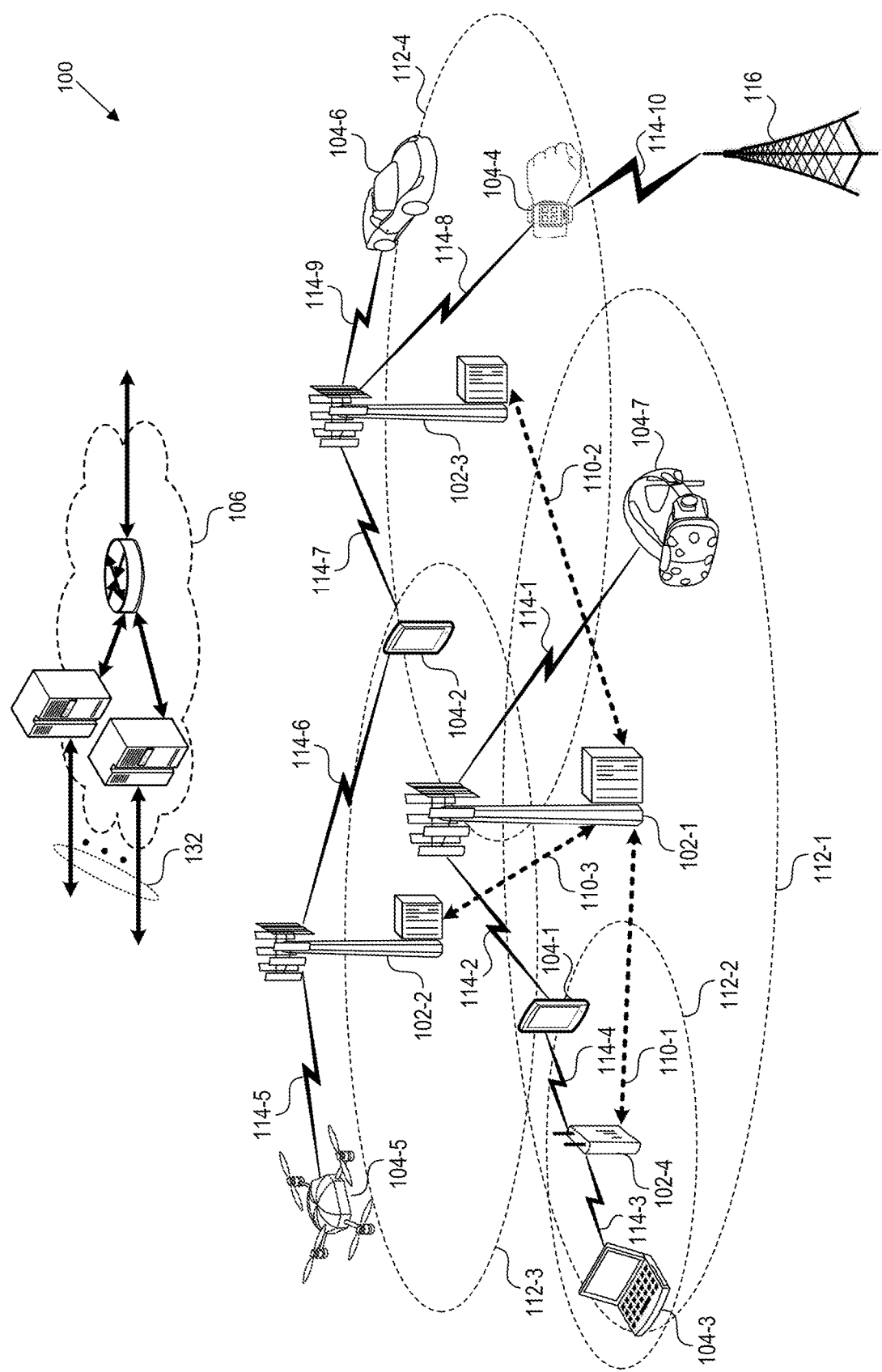
FIG. 1 is a block diagram that illustrates a wireless communications system.

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The system 100 can include any combination of NANs including an access point, radio transceiver, gNodeB (gNB), NodeB, eNodeB (eNB), Home NodeB or eNodeB, or the like. In addition to being a WWAN base station, a NAN can be a WLAN access point, such as an Institute of Electrical and Electronics Engineers (IEEE) 802.11 access point.

The NANs of a network formed by the system 100 also include wireless devices 104-1 through 104-8 (referred to individually as "wireless device 104" or collectively as "wireless devices 104") and a core network 106. The wireless devices 104-1 through 104-8 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over an LTE/LTE-A communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC)), etc.

The system 100 can include a 5G network and/or an LTE/LTE-A or other network. In an LTE/LTE-A network, the term eNB is used to describe the base stations 102 and in 5G new radio (NR) networks, the term gNBs is used to describe the base stations 102 that can include mmW communications. The system 100 can thus form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices with service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively smaller geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), a portable gaming console, or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some implementations, the communication links 114 include LTE and/or mmW communication links.

In some implementations of the system 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Computer System

Figure 2:
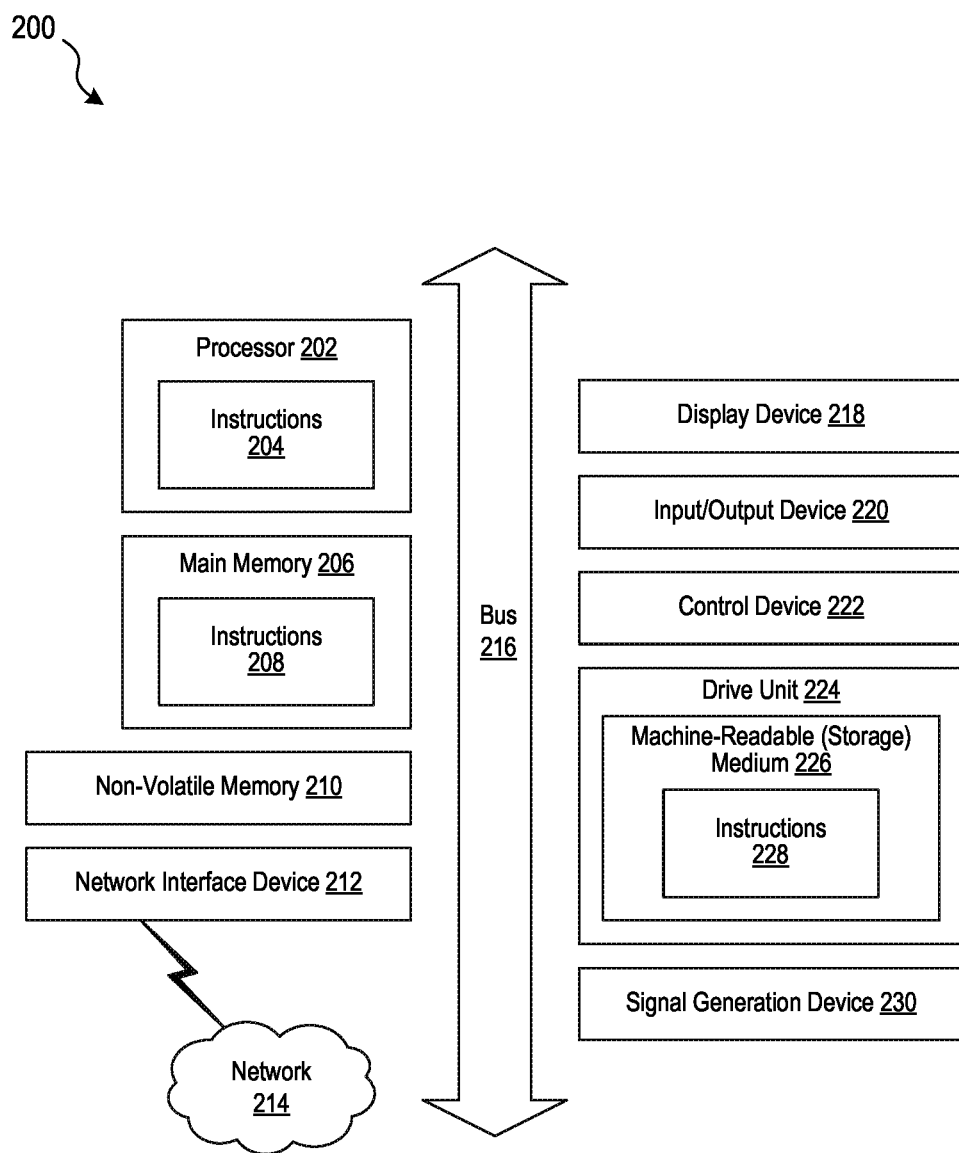
FIG. 2 is a block diagram that illustrates an example of a computer system in which at least some operations described herein can be implemented.

FIG. 2 is a block diagram that illustrates an example of a computer system 200 in which at least some operations described herein can be implemented. As shown, the computer system 200 can include: one or more processors 202, main memory 206, non-volatile memory 210, a network interface device 212, video display device 218, an input/output device 220, a control device 222 (e.g., keyboard and pointing device), a drive unit 224 that includes a storage medium 226, and a signal generation device 230 that are communicatively connected to a bus 216. The bus 216 represents one or more physical buses and/or point-to-point connections that are connected by appropriate bridges, adapters, or controllers. Various common components (e.g., cache memory) are omitted from FIG. 2 for brevity. Instead, the computer system 200 is intended to illustrate a hardware device on which components illustrated or described relative to the examples of the figures and any other components described in this specification can be implemented.

The computer system 200 can take any suitable physical form. For example, the computing system 200 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 200. In some implementation, the computer system 200 can be an embedded computer system, a system-on-chip (SOC), a single-board computer system (SBC) or a distributed system such as a mesh of computer systems or include one or more cloud components in one or more networks. Where appropriate, one or more computer systems 200 can perform operations in real-time, near real-time, or in batch mode.

The network interface device 212 enables the computing system 200 to mediate data in a network 214 with an entity that is external to the computing system 200 through any communication protocol supported by the computing system 200 and the external entity. Examples of the network interface device 212 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 206, non-volatile memory 210, machine-readable medium 226) can be local, remote, or distributed. Although shown as a single medium, the machine-readable medium 226 can include multiple media (e.g., a centralized/distributed database and/or associated caches and servers) that store one or more sets of instructions 228. The machine-readable (storage) medium 226 can include any medium that can store, encoding, or carrying a set of instructions for execution by the computing system 200. The machine-readable medium 226 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 210, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 204, 208, 228) set at various times in various memory and storage devices in computing device(s). When read and executed by the processor 202, the instruction(s) cause the computing system 200 to perform operations to execute elements involving the various aspects of the disclosure.

Dynamic Waveform Switcher

Figure 3:
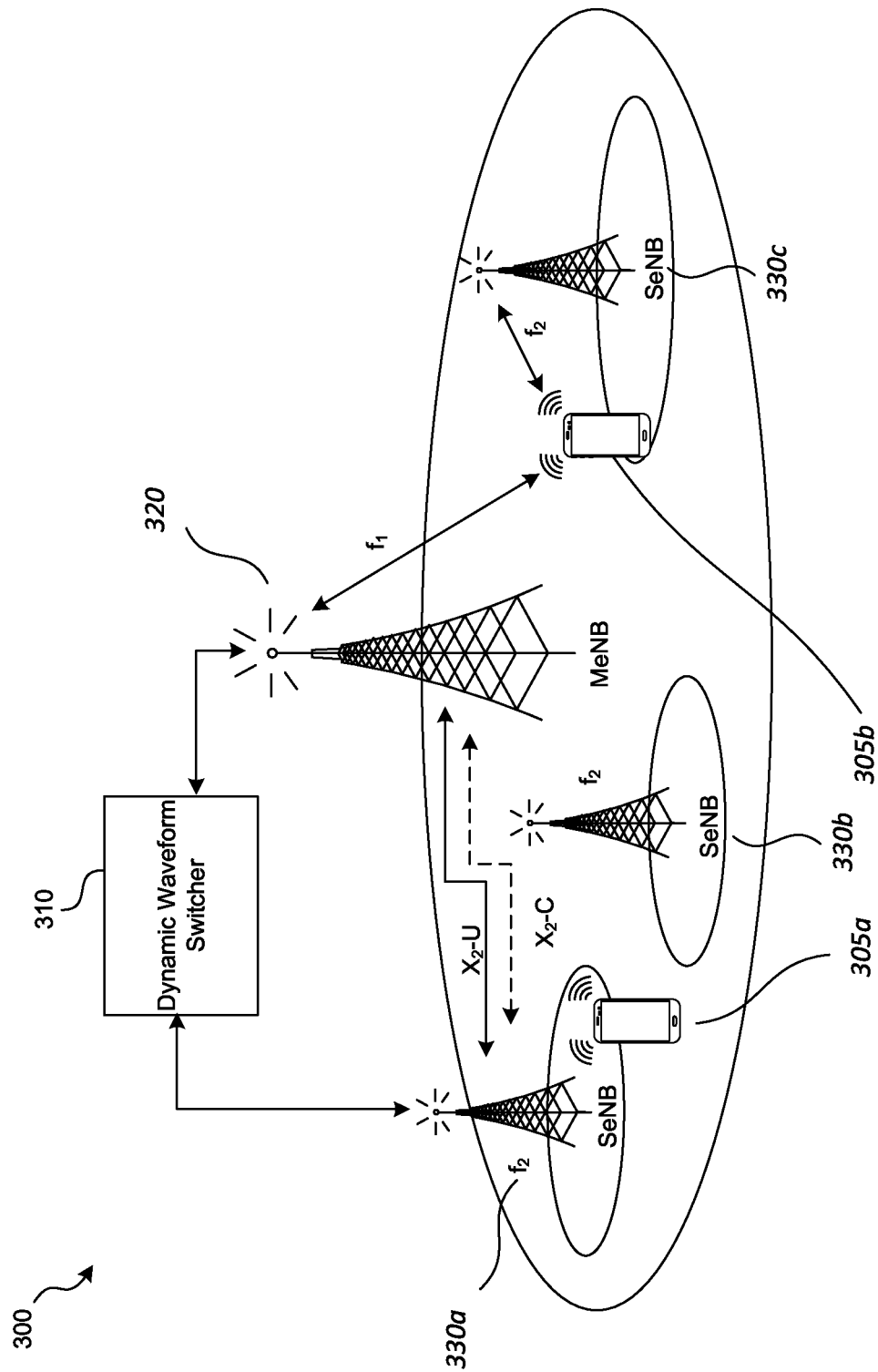
FIG. 3 is a block diagram of a representative environment where the dynamic waveform switcher function can operate.

FIG. 3 is a block diagram of a representative wireless environment 300 where a dynamic waveform switcher function 310 can operate. The dynamic waveform switching function 310 can operate at the medium access control (MAC) layer together with the scheduler and can be located in an eNB/ng-eNB/gNB or in a standalone network node Environment 300 includes user devices (e.g., user devices 305*a* and 305*b*) transmitting and receiving concurrently from/to multiple base stations, for example, small cell 5G NR base stations 330*a*, 330*b*, 330*c* and macro cell 4G LTE base station 320.

Carrier aggregation (CA) and dual connectivity (DC) are techniques used in 4G LTE and 5G NR to allow the UE to utilize the radio resources within multiple component carriers to improve the UE's throughput and reliability. Use of a single transmitter chain in device 305*a/b* for aggregated-carrier systems (such as DC and CA) is a common architectural choice for various reasons, e.g., power, area, cost, etc. However, several issues can arise when the same transmitter chain is used to process the signals destined for different cells and carried by different component carriers, e.g., when several signals close in frequency are processed through non-linear components. One such issue is related to intermodulation distortion (IMD).

IMD arises due to non-linear mixing of multiple frequencies especially through high power/gain devices such as power amplifiers in mobile devices. For example, devices 305*a/b* can be configured to operate with different radio access technologies (RATs), for example an LTE RAT and an NR RAT, i.e., in E-UTRAN-NR Dual Connectivity (EN-DC) mode. In this mode, the network or the mobile device can transmit an NR signal in resource blocks allocated around frequency f1, and an LTE signal at resource blocks allocated around frequency f2, where f1>f2, and f1 and f2 are within the same LTE/NR frequency band. Non-linear mixing in the device 305*a/b* through, for example, the power amplifier (PA) can produce second order distortion products (IM2) at frequencies f2+f1 and f2−f1, third order intermodulation products (IM3) at frequencies 2f2−f1 and 2f1−f2, fifth order intermodulation products (IM5) at frequencies 3f2−2f1 and 3f1−2f2, etc. That is, UL transmit signal in the device 305*a/b* would not only have the intended NR signal around frequency f1 and the intended LTE signal around frequency f2, the UL transmit signal would also contain some or all of the above-identified unwanted frequencies. Typically, the most problematic intermodulation products are the third order intermodulation products 2f2–f1 and 2f1–f2, because, if f2 and f1 are close in frequency (e.g., in the same LTE/NR band), the resulting upper and lower third order products can fall within that very LTE/NR band. When the intermodulation products fall within the band of interest (i.e., the band carrying the transmitted or received data), this can be a serious problem because the resulting unwanted frequencies cannot easily be filtered out (because the unwanted frequencies overlap with the intended frequencies f1 and f2). These resulting unwanted frequencies can leak into the DL receiver paths desensitizing the main and diversity receivers of devices 305*a/b*, and thereby degrading the receivers' performance. That is, intermodulation distortion affects not just the UL signal quality, but can also degrades the DL signal quality. The problem with intermodulation distortion tends to be exacerbate the further away the mobile devices are from the base station because UL transmit power tends to be larger, thereby increasing the power of the intermodulation products. The disclosed technology reduces or eliminates such IMD products for example in intraband multiple-component-carrier UL transmit architectures as will be described below.

The dynamic waveform switcher 310 determines or specifies the UL waveforms or UL access schemes for devices 305*a/b* to minimize or eliminate IMD. In some implementations, the dynamic waveform switcher 310 can monitor the frequency resources allocated for DL and UL transmissions by an eNodeB (eNB) for LTE radio access networks (RANs), by an ng-eNB for 5G non-standalone (NSA) access, or by a gNB for 5G standalone (SA) access, and determine what UL waveform to specify for use by devices 305*a/b*. To enable this determination, base stations 320 and 330*a/b/c* can communicate with each other and with the dynamic waveform switcher 310 via the X2 protocol including the X2 user plane (X2-U) and X2 control plane (X2-C) protocols (the dynamic waveform switcher 310 can be implemented in any of base stations 320 or 330*a/b/c* or in any other node in the core or access network). The communication between base stations can provide the waveform switcher 310 with information on the frequency bands scheduled or to be scheduled for DL and UL transmissions. How the dynamic waveform switcher determines or specifies UL waveforms for use by devices 305*a/b* based on allocated or scheduled UL/DL frequency resources is described next.

Figure 4:
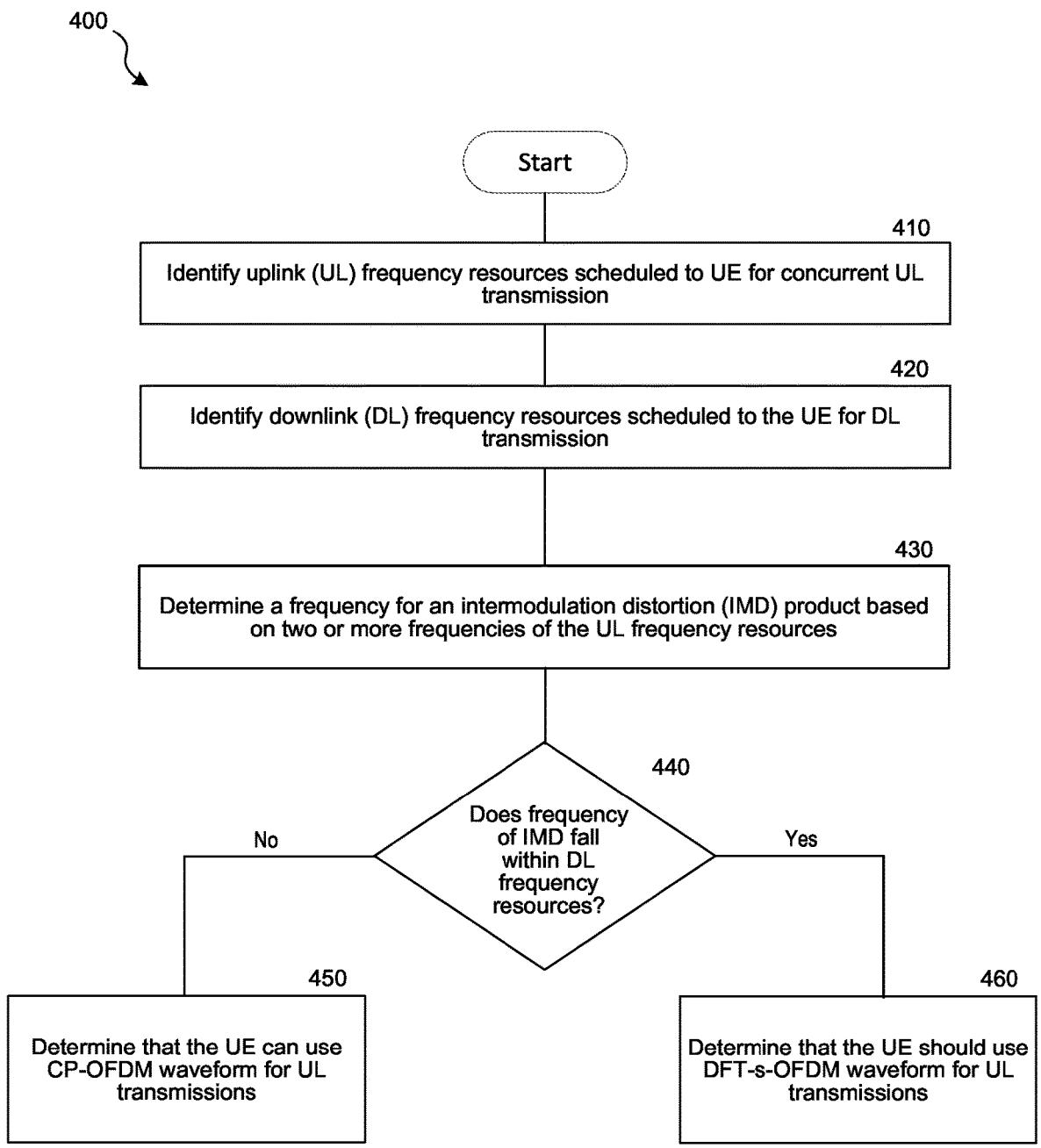
FIG. 4 is a representative flow diagram illustrating a method for determining waveforms for uplink (UL) transmissions, The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

FIG. 4 is a representative flow diagram 400 illustrating a method for determining waveforms for uplink (UL) transmissions. Flow 400 can be implemented in dynamic waveform switcher 310 of FIG. 3 and/or in one or more of the eNB, ng-eNB, or gNBs 330*a/b/c* described in FIG. 3 and/or a different node in the core network or radio access network (collectively referred to as "the network" in the subsequent description).

At block 410, the network identifies or determines UL frequency resources, e.g., bands or frequencies of UL component carriers (CCs) allocated or scheduled (or to be allocated/scheduled) to the UE for concurrent UL transmissions (e.g., a first UL CC and a second UL CC for 2-carrier DC/CA). The concurrent UL transmissions can be on different inter-band or intra-band component carriers (i.e., multiple uplink component carriers for use with DC or CA) where at least one component carrier corresponds to a first radio access technology (RAT) and at least another component carrier corresponds to a second RAT, different from the first RAT.

For example, at block 410, the network can identify scheduled (or to-be-scheduled) UL frequency grants to the UE operating in UL dual-connectivity (DC) mode or UL carrier aggregation (CA) mode. For example, the network can determine that one UL frequency for the UE is E-UTRAN/LTE band 3 at ~1700 MHz and another UL frequency for the UE is NR band n78 at ~3500 MHz for an EN-DC transmission. Other examples: the network can determine that UL frequencies are LTE band 41 and NR band n41 at ~2500 MHz, or LTE band 71 and NR band n71 at ~600 MHz or UL transmission at NR band n78 at ~3.5 GHz and DL transmission at LTE band 3 at ~1.8 GHz. As will be described further below, DC/CA with component carriers in B41/n41, for example, can create IMD in DL receiver.

At block 420, the network identifies or determines DL frequency resources, e.g., DL bands, frequencies, or CCs, allocated or scheduled (or to be allocated/scheduled) to the UE for DL transmission. The identified DL frequency resources are frequency resources for use for DL transmission at the same time as the UL frequency resources are being used for concurrent UL transmissions. This is because intermodulation distortion occurs when intermodulation products fall in the same time-frequency grid as a concurrent reception or transmission so that the unwanted/spurious frequencies interfere with the intended transmissions/receptions in the affected bands. In some implementations, identifying the UL frequency resources at block 410 and identifying the downlink (DL) frequency resources at block 420 requires communication between an LTE scheduler and an NR scheduler and between the LTE/NR schedulers and the waveform switcher function 310 (which can, in some implementations, be part of either scheduler).

At block 430, the network determines a frequency for an IMD product based on two or more frequencies of the UL frequency resources. Additionally or alternatively, the network can determine the frequency of IMD products based on the combination of UL and DL allocated/scheduled frequencies. For example, if at block 410 the network determined that one component carrier for UL transmission was scheduled for LTE frequency band 71 and another component carrier for concurrent UL transmission was scheduled for NR frequency band n71, the network can determine that IMD products from the UL transmission could fall within the DL frequency band 71/n71 (which is allocated/scheduled for use by the UE for DL transmissions).

In some implementations, the network includes a memory (e.g., a database or lookup table) that stores the combination of UL frequencies that could result in IMD in the corresponding DL frequency. This database or memory can be located in the dynamic waveform switching function 310 of FIG. 3 or in another node on the network. Additionally, the database/memory holding the band information can operate at the MAC layer together with the scheduler. In this implementation, the network can skip the determination of IMD frequencies at block 430 and determine at block 440, based on the stored UL/DL frequency band combinations, that the risk of IMD is high and thereby dynamically switch or selects UL waveforms to minimize IMD as described below. In some implementations, the network can send a query request to the memory (e.g., a processor or server in the network can query the memory or database), where the query request can include a first frequency for a first UL CC, a second frequency for a second UL CC . . . . (etc., for other UL CCs), and a third frequency for DL CC (etc., for other DL CCs). The processor or server in the network can return a query response including data from the memory indicating a risk or a probability that the frequencies in the query request could lead to high IMD (e.g., frequencies of UL CCs could lead to IMD in DL CC(s)). Based on this query response, the network can determine or identify what UL waveform the UEs can/should use for concurrent UL transmissions as described below.

At block 440, the network determines if the IMD product falls within DL frequency resources. That is, if the IMD products generated by UL component carriers for use with UL DC or CA fall within the frequency band allocated or scheduled for DL transmissions to the UE. As described above, in some implementations, the network stores the UL/DL frequency combinations that would lead to high IMD such that at block 440 the network can determine if the scheduled UL/DL frequencies create a high risk of IMD.

If the risk of IMD is high based on the UL/DL frequencies, the network determines at block 460 that the UE should use a Discrete Fourier Transform (DFT)-spread Orthogonal Frequency Multiple Access (OFDM) (DFT-s-OFDM) waveform for UL transmissions. The network can notify the UE to switch to the DFT-s-OFDM waveform if it is currently using a Cyclic Prefix (CP) OFDM (CP-OFDM) waveform. For example, the network (e.g., the dynamic waveform switcher function 310 in FIG. 3) can instruct the UE to switch to or remain with DFT-s-OFDM even when network conditions (e.g., even when channel state information (CSI)) would otherwise allow for CP-OFDM UL transmissions).

Conversely, if the risk of IMD is not high based on the UL/DL frequencies (i.e., if IMD will not fall within a receiving band), the network determines at block 460 that the UE can use a CP-OFDM waveform for UL transmissions (i.e., UE need not switch to DFT-s-OFDM). That is, the network allows the UE to use CP-OFDM waveforms for UL transmissions if other criteria (e.g., CSI) does not require the UE to use DFT-s-OFDM. In some implementations, the network instructs the UE to switch to or remain with the CP-OFDM waveform for UL transmissions.

DFT-s-OFDM waveforms are allocated with contiguous physical resource block (PRB) thereby avoiding an allocation of PRBs with a large frequency gap ("devil's horn" PRB allocation) which can create large IMD components which can desensitize the DL receive path. Although the DFT-s-OFDM waveform is better for IMD mitigation, it is less spectrally efficient than CP-OFDM waveforms. For example, the contiguous PRB allocation of DFT-s-OFDM makes it difficult to allocate multiple UEs with contiguous PRBs unlike CP-OFDM where different UEs can be allocated different non-contiguous PRBs. Thus, the dynamic waveform switcher 310 trades off between a high spectral efficiency allocation with CP-OFDM (e.g., allowing for assignment of frequencies based on the radio frequency (RF) performance of different frequency blocks or CSI feedback from UE) and a low IMD with DFT-s-OFDM. For example, to improve DL efficiency a DFT-s-OFDM waveform can be used because this prevents or reduces the desensitization of the DL receiver. However, use of DFT-s-OFDM can degrade UL efficiency because of the inflexibility of contiguous PRB allocation as described above. To improve UL efficiency a CP-OFDM waveform can be used. In some implementations, the LTE or NR scheduler can allocate contiguous PRBs even for CP-OFDM waveforms thereby removing the need for the mobile device to switch to a DFT-s-OFDM waveform.

For example, with UL CA/DC with 2 component carriers utilizing 2 UL transmitter paths/chains in the UEs transceiver, certain band combinations can result in IMD that falls in the DL receiving path. For example, if the first UL component carrier is at frequency f1 and the second UL component carrier is at frequency f2, the network determines at block 440 whether the upper third order intermodulation (IM3) product at 2*f2−f1 (for f2>f1) and the lower IM3 product at 2*f1−f2 (for f2>f1) would fall within DL frequencies. For example, if f1=668 MHz and f2=688 MHz (LTE/NR bands 71/n71), the upper intermodulation product would be at 708 MHz; and the lower intermodulation product would be at 648 MHz. Because 648 MHz is also in LTE Band 71 and NR band n71 DL band, the concurrent UL transmissions could interfere with DL transmissions utilizing the resource blocks at channels occupying 648 MHz. In this case, the network can determine at block 460 that the UE should use DFT-s-OFDM to force contiguous PRB allocation which could minimize IMD.

The intermodulation distortion problem discussed above is exacerbated when the different components carriers are in the same band (intraband), particularly for the E-UTRAN/NR dual connectivity (EN-DC) case where the first transmission is targeted to the E-UTRAN/LTE radio network and the second transmission is targeted to the 5G NR network. This is because, unlike for the CA case where the eNB or ng-eNB can turn off intraband component carriers and revert to single carrier transmission when problems are detected, the EN-DC configuration often requires having both carriers active for full-duplex transmit/receive operation.

Additionally, even where simultaneous uplink transmissions on different intra-band component carriers (e.g., intra-band contiguous EN-DC) may not be required by 3GPP standards, it is still beneficial for devices to allow for such band combinations as this can lead to better spectral efficiency for the network and better user experience (e.g., higher throughput). The technology disclosed here allows for UEs to support such non-mandatory dual connectivity cases without any changes to the UE hardware. Furthermore, the systems and methods disclosed herein are frequency agnostic and so can be adapted for any frequency band, for example, E-UTRA/LTE band 41 and 5G NR band n41 at 2496-2690 MHz, LTE band 41 and NR band n41 at 2496-2690 MHz, LTE band 3 and NR band n78, and others.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention. For example, U.S. Pat. No. 10,904,935 (the '935 patent) describes a smart scheduler for IMD avoidance that can use the dynamic waveform switching technique described herein. Additionally or alternatively, the smart scheduler described in the '935 patent can be used to allocate PRBs to avoid the "devil's horn" non-contiguous PRB allocation without needing to switch the UL transmission waveform.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A non-transitory computer-readable storage medium comprising instructions recorded thereon that, when executed by at least one data processor of a system of a wireless communication network, cause the system to perform a method of determining waveforms for uplink (UL) transmissions in a mobile device operating in the wireless communications network, the method comprising:
   receiving signals identifying UL frequency resources scheduled to the mobile device for concurrent UL transmissions;
   receiving signals identifying downlink (DL) frequency resources scheduled to the mobile device for DL transmissions; and,
   automatically determining, based on the UL and DL frequency resources, a waveform for use by the mobile device for the concurrent UL transmissions,
      wherein the determining is based on a frequency of an intermodulation distortion (IMD) product of two or more frequencies of the UL frequency resources,
      wherein the mobile device is to use a Discrete Fourier Transform (DFT)-spread Orthogonal Frequency Division Multiplexing (OFDM) (DFT-s-OFDM) waveform for the concurrent UL transmissions when the frequency of the IMD product is within the DL frequency resources, and
      wherein the mobile device can use a Cyclic Prefix (CP) OFDM (CP-OFDM) waveform for the concurrent UL transmissions when the frequency of the IMD product is not within the DL frequency resources.

2. The non-transitory computer-readable storage medium of claim 1, wherein the concurrent UL transmissions comprise dual connectivity transmissions with multiple uplink component carriers, and wherein each one of the component carriers in the multiple uplink component carriers is in the same frequency band.

3. The non-transitory computer-readable storage medium of claim 1, wherein the concurrent UL transmissions comprise multiple-uplink carrier aggregation transmissions.

4. The non-transitory computer-readable storage medium of claim 1, wherein the concurrent UL transmissions comprise UL transmissions on different intra-band component carriers.

5. The non-transitory computer-readable storage medium of claim 1, wherein the concurrent UL transmissions comprise UL transmissions on different intra-band component carriers and at least one component carrier of the intra-band component carriers corresponds to a first radio access technology (RAT) and at least one component carrier of the intra-band component carriers corresponds to a second RAT, different from the first RAT.

6. The non-transitory computer-readable storage medium of claim 1, wherein the concurrent UL transmissions comprise an LTE UL transmission and an NR UL transmission.

7. The non-transitory computer-readable storage medium of claim 1, wherein the concurrent UL transmissions comprise UL transmissions on different intra-band component carriers, wherein the different intra-band component carriers comprise component carriers in LTE band 41 and component carriers in NR band n41.

8. The non-transitory computer-readable storage medium of claim 1, wherein the concurrent UL transmissions comprise an LTE UL transmission in LTE band 71 at around 600 MHz and an NR UL transmissions in NR band n71 at around 600 MHz, and the DL transmissions comprise an LTE DL transmission in LTE band 71 or an NR DL transmission in NR band n71.

9. The non-transitory computer-readable storage medium of claim 1, wherein the DL transmissions comprise an LTE band 3 DL transmission at around 1.8 GHz, and wherein the concurrent UL transmissions comprise an NR band n78 UL transmission at around 3.5 GHz.

10. The non-transitory computer-readable storage medium of claim 1, wherein the identifying the UL frequency resources and the identifying the downlink (DL) frequency resources comprises communicating between an LTE scheduler and an NR scheduler.

11. A method, implemented in a wireless communication network, of determining an uplink (UL) access scheme for use by a user equipment (UE), the method comprising:
identifying a first frequency band of a first UL component carrier (CC) and a second frequency band of a second UL CC,
wherein the first frequency band and the second frequency band are scheduled for use by the UE for concurrent UL transmissions;
identifying a third frequency band of a downlink (DL) CC, wherein the third frequency band is scheduled for use by the UE for DL transmissions; and,
determining, based on the first frequency band, the second frequency band, and the third frequency band, an UL access scheme for use by the UE for the concurrent UL transmissions;
wherein the determining of the UL access scheme for use by the UE for the concurrent UL transmissions based on the first frequency band, the second frequency band, and the third frequency band is based on a frequency of an intermodulation distortion (IMD) product of at least the first frequency band and the second frequency band;
wherein the determining of the UL access scheme for use by the UE for the concurrent UL transmissions based on the first frequency band, the second frequency band, and the third frequency band, comprises:
querying a memory in the wireless communication network;
wherein the query includes the first frequency band, the second frequency band, and the third frequency band; and,
receiving a query response, wherein the query response identifies the UL access scheme for use by the UE for the concurrent UL transmissions, and
wherein the query response relates to a risk for an IMD product at the third frequency band for the DL transmissions.

12. The method of claim 11, wherein the UL access scheme is at least one of a Discrete Fourier Transform (DFT)-spread Orthogonal Frequency Division Multiplexing (OFDM) (DFT-s-OFDM) access scheme or a Cyclic Prefix (CP) OFDM (CP-OFDM) access scheme.

13. The method of claim 11, wherein the first UL CC and the second UL CC comprise intra-band CCs, the first UL CC corresponds to a first radio access technology (RAT) and the second UL CC corresponds to a second RAT, different from the first RAT.

14. The method of claim 11, wherein the first UL CC corresponds to an LTE RAT and the second UL CC corresponds to an NR RAT.

15. The method of claim 11, wherein the concurrent UL transmissions comprise multiple-uplink carrier aggregation transmissions.

16. A system configured to determine the uplink (UL) transmission waveform for use by a user equipment (UE) within a wireless communication network of a first radio access technology (RAT) operating in a dual connectivity mode with a second RAT, different from the first RAT, the system comprising:
at least one hardware processor; and
at least one non-transitory memory, coupled to the at least one hardware processor and storing instructions, which, when executed by the at least one hardware processor, cause the system to:
identify UL frequency resources scheduled to the UE for concurrent UL transmissions;
identify downlink (DL) frequency resources scheduled to the UE for DL transmissions; and,
determine, based on a frequency of an intermodulation distortion (IMD) product of two or more frequencies of the UL frequency resources, a waveform for use by the UE for the concurrent UL transmissions,
wherein the UE is to use a Discrete Fourier Transform (DFT)-spread Orthogonal Frequency Division Multiplexing (OFDM) (DFT-s-OFDM) waveform for the concurrent UL transmissions when the frequency of the IMD product is within the DL frequency resources, and
wherein the UE can use a Cyclic Prefix (CP) OFDM (CP-OFDM) waveform for the concurrent UL transmissions when the frequency of the IMD product is not within the DL frequency resources,
wherein, based on the frequency of an intermodulation distortion (IMD) product of two or more frequencies of the UL frequency resources, the waveform for use by the UE for the concurrent UL transmissions comprises:
sending a query request to a memory in the wireless communication network, the query request including the UL frequency resources and the DL frequency resources;
receiving a query response from the memory, wherein the query response identifies a risk for an IMD product at a frequency within the DL frequency resources; and,
determining, based on the query response, the waveform for use by the UE for the concurrent UL transmissions.

17. The system of claim 16, wherein the concurrent UL transmissions comprise an LTE UL transmission and an NR UL transmission.

18. The system of claim 16, wherein the concurrent UL transmissions comprise UL transmissions on different intra-band component carriers.

\* \* \* \* \*